Dec. 22, 1970     A. V. LA ROCCA     3,549,436
LAYERED PROPELLANT COMPOSITION CONSISTING OF AN ELECTRICAL
CONDUCTOR AND AN INSULATOR
Filed Dec. 13, 1967

INVENTOR:
ALDO V. LaRocca,
BY Henry W. Kaufmann
AGENT

United States Patent Office 3,549,436
Patented Dec. 22, 1970

3,549,436
LAYERED PROPELLANT COMPOSITION CONSISTING OF AN ELECTRICAL CONDUCTOR AND AN INSULATOR
Aldo V. La Rocca, Villanova, Pa., assignor to General Electric Company, a corporation of New York
Filed Dec. 13, 1967, Ser. No. 690,168
Int. Cl. C06c 3/10
U.S. Cl. 149—15                                  2 Claims

ABSTRACT OF THE DISCLOSURE

Discrete quantities of solid vaporizable propellant are provided as lamina of solid slug, fed by spring against insulating stop into interelectrode region where electrical discharge initially strikes down to lamina, gasifying it and then continues through gas, adding energy which causes ejection of gas with high momentum. Paschen's law causes discharges to take long path down to lamina until its complete gasification raises pressure sufficiently to permit the discharges to follow shorter path through gas. Lamina are separated by non-conductive layer; may be exothermically reactive to add thermal energy to gas.

---

Figure 1:
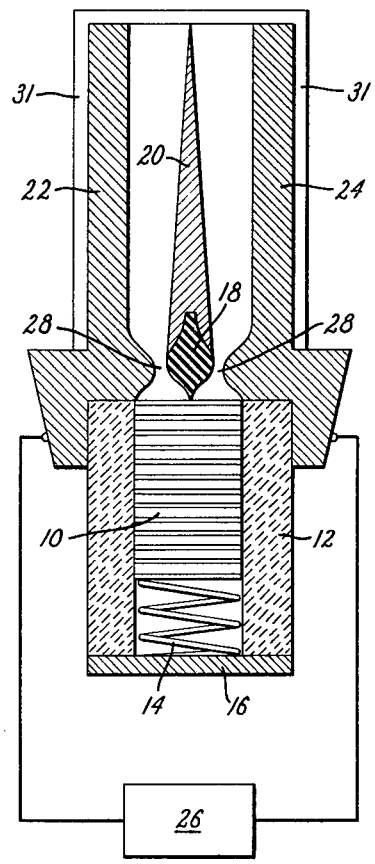

This invention pertains to the art of reaction propulsion, and more specifically to the practice of this art by adding energy to gases by electrical discharges therethrough.

In U.S. Pat. 3,270,498 I teach the production of controllable impulses of momentum by gasifying solid or liquid material by an electrical discharge. In a particular embodiment of that invention I teach the control of the amount of gas produced by control of the amount of energy provided to gasify the solid or liquid, the solid being finely divided and carried by a fluid vehicle. In the present invention I teach a particular form of gasifiable propellant which may be completely or substantially solid and can thus be provided in the form of a slug which may be fed by a simple spring. Utilizing and feeding such a solid slug may create certain problems: the exposed face of the solid must be ablated uniformly in order that operating conditions may remain uniform from operation to operation; failure of uniform ablation can result in residues of material under any overhanging or retaining stops, which will prevent proper forward feed, and can also result in random distribution of the gasifying discharge which will waste energy and have other disadvantages. In order to prevent the mass of the slug from providing a shunting path which will wastefully carry part of the discharge down below the exposed surface, it is necessary to make the electrical conductivity parallel to the exposed face greater than that normal to the exposed face. The particular embodiment I now teach is also peculiarly adapted to provide gas in predetermined discrete quantities which will not be varied by small variations in the gasifying energy supplied. I also teach particular electrode configurations which are beneficial in automatically directing the applied electrical energy to the quantum of material to be gasified until this gasification is complete, and then diverting it to the gas thus formed in order to add energy to it and accelerate it. My present invention also facilitates the use of exothermally reactive materials to add controlled amounts of chemically derived thermal energy to the gas, whereby more energy is made available than is derived from the applied electrical energy.

Thus it is evident that I achieve the object of providing a thrust device which produces thrust impulse in readily predetermined amounts, which may exceed that producible by the applied electrical energy, and yet is as readily controlled as the electrical energy itself; and of providing the gasifiable material, or propellant employed in a form which is particularly easily handled, stored, and automatically fed into the apparatus. Achievement of these objects results in many benefits of simplicity, reliability, and economy which will be obvious to those skilled in the art after consideration of the detailed description which follows.

Figure 2:
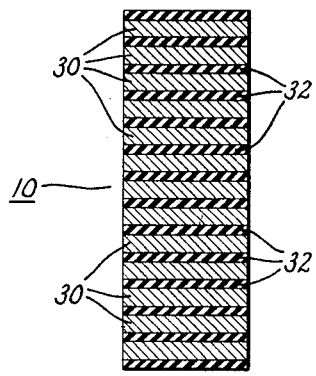

For the better understanding and explanation of my invention I have provided figures of drawing in which:

FIG. 1 represent schematically in section an embodiment of my invention including a particular electrode structure and feeding means for the propellant structure of my invention; and FIG. 2 represents specifically an embodiment of the propellant structure itself.

Referring to FIG. 1, there is represented a slug 10 of propellant which is a sliding fit in a holder 12, which may be ceramic tube, or other electrically insulating material. A spiral spring 14, resting against a back plate 16, presses against the lower portion of slug 10, causing it to rest against stop 18, which in the present embodiment is represented as insulating and may be of suitable ceramic such as alumina. Step 18 is an insert in a central spike 20, which is tapered so that, as represented, it forms an expanding path between electrodes 22 and 24, which are represented connected to the output terminals of an electrical pulse source 26. Electrodes 22 and 24 are so shaped adjacent to stop 18 as to form a converging-diverging nozzle whose narrowest part or throat 28 lies slightly above the topmost layer of slug 10. To enclose the chamber formed by electrodes 22 and 24, an insulating plate 31, which may conveniently be of ceramic to withstand the highly ionized and energetically active discharges, is placed firmly (preferably sealed) against electrodes 22 and 24; and a similar plate, not shown because it would conceal the other elements such as spike 20, is placed on top of electrodes 22 and 24. When a high voltage pulse is produced by source 26, a discharge will initially occur between electrodes 22 and 24 to the conductive upper layer of slug 10. Under the action of such discharge part of this upper layer or lamina will undergo gasification immediately, creating a low pressure gas immediately above the slug 10. However, since the outlet of the chamber formed by electrodes 22 and 24 will, in ordinary use, be connected to a space at very low pressure, the pressure of the gas first formed will be so low that, by Paschen's law, the discharge between electrodes 22 and 24 will continue to follow the longer path down to the remaining parts of the upper layer of slug 10 to complete its gasification. When the gasification is completed the pressure will have risen sufficiently high so that the discharge will move through the ionized gas itself to throat 28. Because of the continued energy addition the gas is made to expand and caused to move out through throat 28 and along the gradually widening path between the electrodes, while the discharge, responsively to magnetic fields which may be those created by the current of the discharge itself flowing through the electrodes 22 and 24 (or may be supplemented by external magnets) moves with the gas to the upper ends of electrodes 22 and 24, where the gas will be ejected at high velocity. Such a discharge of gas (which will be highly ionized) may be used directly to produce thrust or may be fed into an auxiliary electrode system for the introduction of more energy into it, with further acceleration. The gasification of the uppermost layer of slug 10 will permit spring 14 to move it forward by the thickness of the removed layer, so that its newly exposed layer will now rest against stop 18, ready for repetition of the cycle.

Central spike 10 is a particular example of a more general kind of stop which retains the surface to be gasified at its proper point of advance, without impeding gasification by the discharge and without shielding the surface from the discharge and thus permitting a residue to remain. The general characteristics of such stops is that they lie in the path of the discharge across the slug face, and that they cover a small enough area of the face so that the material even directly in contact with them will nevertheless be removed by the discharge. These requirements are met by a pointed central spike like 10; they could also be met by a knife-edged stop short enough not to extend past the path of the discharge. For similar reasons, electrodes themselves must not extend over the face of the slug, since discharges occur from the electrode edge outward away from the electrode, and there would be no discharge occurring beneath the electrode to remove the material there.

While Paschen's law may be expected to cause the initial discharge to occur down to slug 10 regardless of the insulating or conductive nature of stop 18, it is advantageous to make it of insulating material in that this reduces the possibility of the discharge being shunted away from the layer of slug 10 before gasification is complete. When gasification is complete, sufficient pressure will have been built up in the throat 28 so that the discharge will switch up to that location and then move further down stream. Thus stop 18 may serve as a kind of automatic sequential switching device. A staged mode of operation is obtained when the discharge closes again through the plasma and the conducting portion of the spike. This occurs in a region where the gradients of fluid dynamic and magnetic pressure are very favorable to the conversion of the added energy into the form of directed kinetic energy of the gas.

FIG. 2 represents the very simple scheme of slug 10; it comprises simply alternating layers 30 and 32, which are represented for convenient delineation as black and white. Layers 30 are the gasifiable propellant layers, and layers 32 constitute the barriers between otherwise adjacent layers 30. Layers 30 may contain some readily vaporizable and ionizable material, preferably a metal such as cesium, or lithium, or a mixture of a readily vaporizable metal not easily ionized with a seeding material readily ionized, which may also be cesium or lithium. Exothermally reactive materials such as explosives, may also be included. Layers 32 are simply protective and insulating thin layers which keep the discharge from initiating vaporization of a second layer 30 before expulsion of the previously vaporized layer 30 has been completed. If they were not present, there would be danger that mass vaporization of an entire slug 10 would occur, since it would present a very low resistance path between electrodes 22 and 24 if it were simply a large isotropic conductive mass; but the subdivision by layers 32 renders it anisotropic, considered as a mass, and prevents this, while still presenting only a single, easily ruptured, layer 32 between the electrodes 22 and 24 and the single topmost layer 30 which it *is* desired to vaporize.

In demonstrating the operativeness of this device, I have employed an electrode system in which the thickness of the slug 10 which could be accommodated was about 3/8 inch. The maximum width of stop 18 was approximately 3/16 inch; the spacing between the straight parallel sides of electrodes 22 and 24 was approximately 3/4 inch, and their thickness (normal to the plane of FIG. 1) was approximately 3/16 inch.

One from of slug 10 was produced by employing a base of 0.0005-inch thick plastic film (sold under the commercial name of "Mylar") which had been coated with aluminum by vacuum evaporation. This was coated with a lacquer of ammonium perchlorate in nitrocellulose to a dried thickness of about 0.00025 inch. Layers of this were stacked in the configuration represented in FIG. 2. The layer of plastic film thus corresponded to layer 32, the protective and insulating layer; and the aluminum coating with the lacquer of ammonium perchlorate in nitrocellulose upon it corresponded to layer 30, the gasifiable propellant layer. The plastic film is a homogeneous layer of electrically insulating material; and the aluminum coating renders the propellant layer electrically conductive.

"Clean" firing by complete gasification of one layer prior to gasification of the next was achieved by use of this slug; and the thrust obtained by its use was approximately two orders of magnitude greater than that obtained by the addition of the same quantity of electrical energy to a non-exothermal material. Clean feeding was achieved, with no "shouldering" or other impediments to feeding such as would have been produced by incomplete gasification of preceding layers. The aluminum coating served the double function of providing a conductive initial path for the discharge, and of seeding the gas after gas formation.

It is possible to employ for the same purpose slugs of material which is naturally anisotropic so that its electrical conductivity in one plane is much greater than along an axis normal to such a plane. Such a material, for example, is pyrolytic graphite, which is typical of anisotropic solids produced by a recrystallization process resulting in ordered realignments of the crystals in plane layers. Also, electrodes need not be parallel, but may be coaxial to employ a slug having a central hole, in which case the stop might be in the form of a feather-edged tube coaxial with the electrodes. Similarly, if there were any reason for changing the total mass or the composition of material in a given layer 30 which was near the bottom of the slug 10 from that which was in the layers in the remainder, or for providing a continuous increase or decrease of the mass per layer throughout the slug 10, this could obviously be done.

To generalize the description which has been given, it may be pointed out that the solid propellant represented by FIG. 2 has as its outstanding characteristic that its elecrical conductivity parallel to its exposed "working" face is greater than normal to the exposed face. Various benefits attach to the solid being laminated, to its being made up of alternating lamina of insulating material and of electrically conductive material; to its containing ionization seeding material; to its containing exothermally decomposable materials. Similarly, while a plane exposed face has been represented, if it were desirable to produce an expanding partly spherical flow of gas, it would be perfectly possible to curve the exposed face of the propellant.

Similarly, holder 12 need be only a generic guide means, of any form compatible with its requred function. Spring 14 may be replaced by any other source of force to feed the slug. Stop 18–20 is characterized by the fact that it contacts a minimal area of the exposed face of the slug in the path of the discharge, and stops the face in a suitable location to receive the discharge from the electrodes. If its tip adjacent to the face of the propellant slug 10 is made of insulating material, it will keep the discharge from occurring parallel and adjacent to but out of contact with the exposed face of the slug 10. Thus it is only when the gas pressure is sufficiently high to permit the discharge to occur remote from, or non-adjacent to, the exposed face that the discharge ceases to be concentrated over the exposed face.

What is claimed is:

1. Solid propellant for use in an electrical propulsion device consisting of layers of electrically conductive material;

arranged alternately with layers of a single material which is electrically insulating.

2. The product claimed in claim 1 in which said electrically conductive material is a layer of aluminum and said electrically insulating mateiral is a thin organic plastic film.

References Cited

UNITED STATES PATENTS 2,977,885    4/1961    Perry et al. _____ 149—15X
3,159,104   12/1964    Hodgson _____ 102—101

CARL D. QUARFORTH, Primary Examiner

S. J. LECHERT, Jr., Assistant Examiner

U.S. Cl. X.R.

149—14